July 31, 1956  E. C. FROST  2,756,693
CARGO TIE-DOWN FITTING
Filed May 10, 1952  2 Sheets-Sheet 1

INVENTOR.
EUGENE C. FROST
BY
George Sullivan
Agent

July 31, 1956 — E. C. FROST — 2,756,693
CARGO TIE-DOWN FITTING
Filed May 10, 1952 — 2 Sheets-Sheet 2

INVENTOR.
EUGENE C. FROST
BY George C. Sullivan
Agent

United States Patent Office 2,756,693
Patented July 31, 1956

2,756,693

CARGO TIE-DOWN FITTING

Eugene C. Frost, Burbank, Calif., assignor to Lockheed Aircraft Corporation, Burbank, Calif.

Application May 10, 1952, Serial No. 287,089

5 Claims. (Cl. 105—369)

This invention relates to an improved and simplified detachable cargo tie-down fitting for lashing or tying down cargo to prevent shifting and bouncing thereof. The fitting of this invention is primarily for use in the cargo compartments of airplanes, but would be useful in railroad cars, trucks and the like.

It is an object of this invention to provide an improved and simplified tie-down fitting comprising a male member fixed to the floor and/or walls of a cargo compartment, and a female member arranged to engage over and detachably lock to the male member, the female member being adapted to be engaged by and to serve as anchor points for straps, nets and/or rope lashings holding the cargo in place.

It is a further object of this invention to provide an improved and simplified detachable cargo tie-down fitting of the type described wherein the fitting member is applied to a stud permanently attached to the floor and/or walls whereby the floor may be built water tight, and the floor recess for the stud will not become clogged by dirt and the like.

It is another object of this invention to provide an improved and simplified cargo tie-down fitting of the type described that is detachable and swivellingly mounted and requires a minimum size of recess to lie flush with the floor or walls if left in place when not in use.

It is also an object of this invention to provide a tie-down fitting of the class described which can be applied to studs also usable for chairs or litters stanchions to facilitate conversion of an airplane from cargo to passenger or hospital use, or the reverse, eliminating the need of provisions for separate cargo tie-down mountings.

Figure 1:
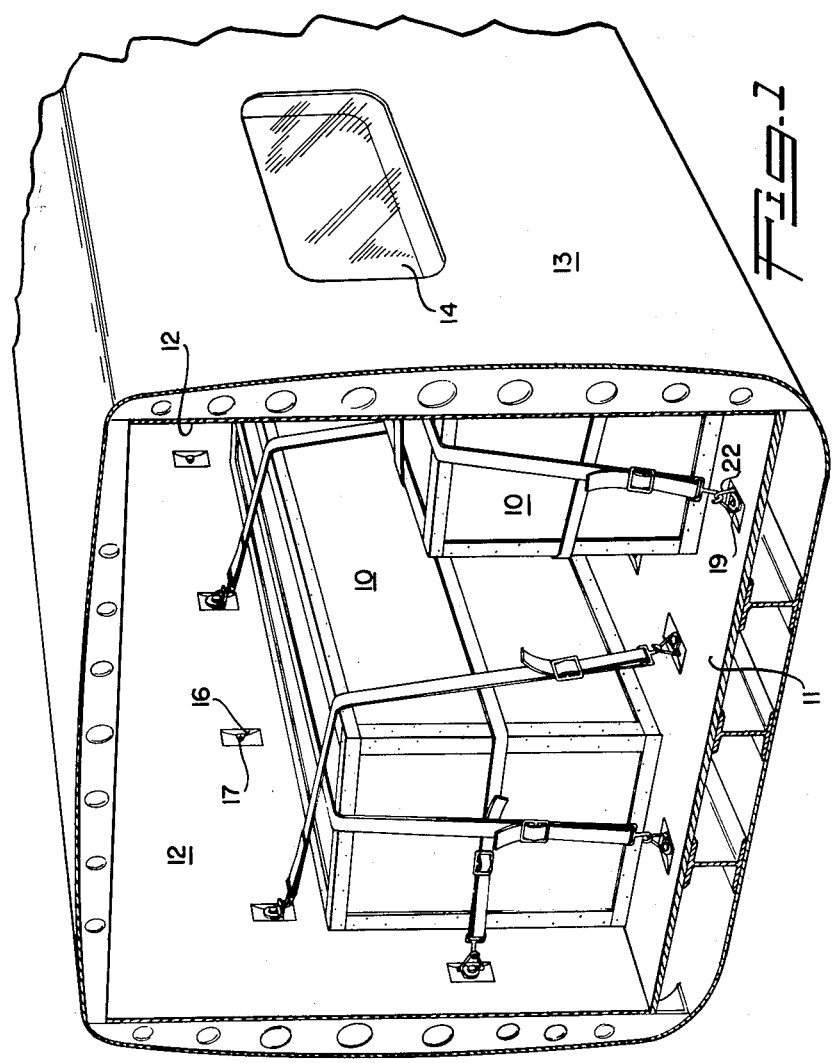
Figure 2:
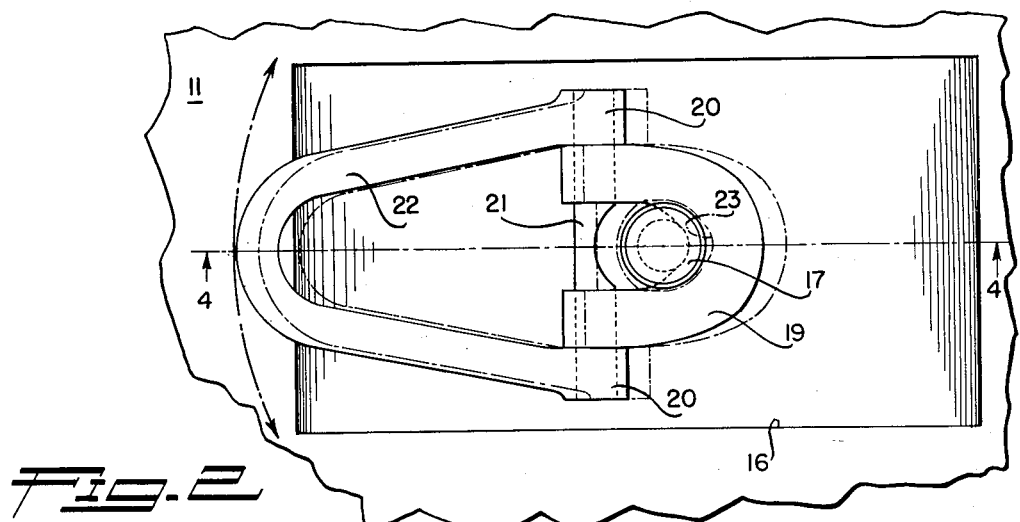
Figure 3:
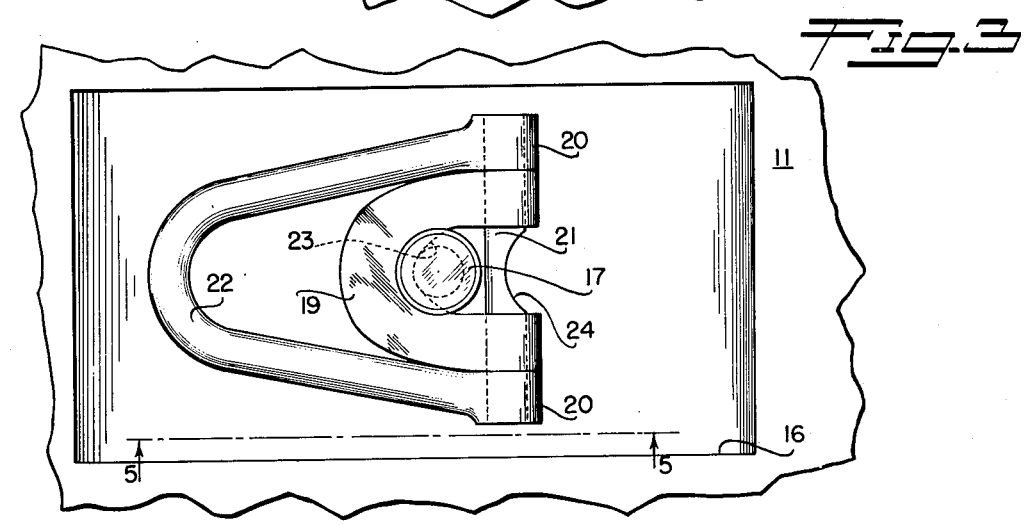
Figure 4:
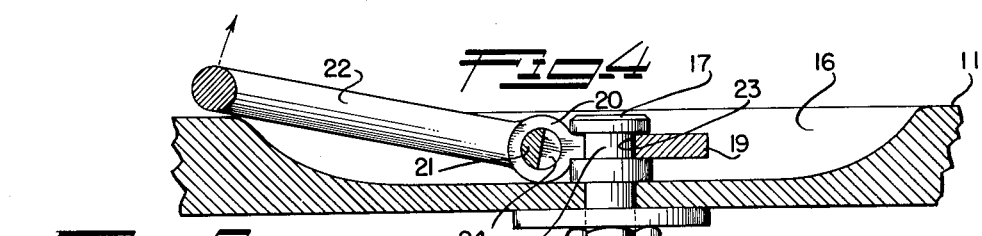
Figure 5:
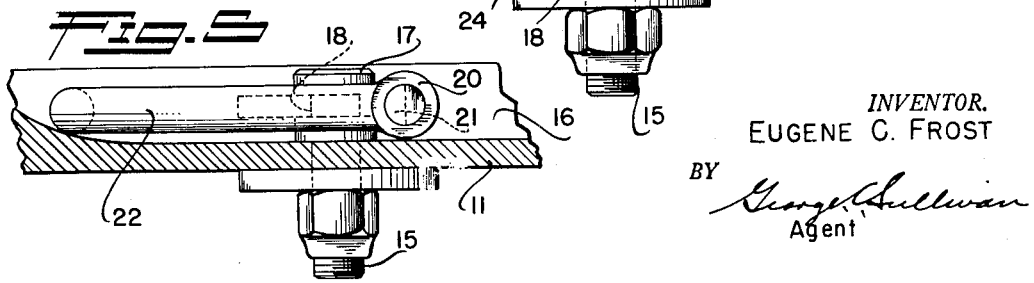

Other objects and advantages of my invention will appear from the following description taken in connection with the accompanying drawings, wherein:

Figure 1 is a perspective view of a cross section of a cargo airplane fuselage showing the use of the tie-down fittings of this invention in connection with straps holding crates in position in the fuselage; and Figure 2 is a plan view of a tie-down fitting in position, the full lines showing the tie-down in its loaded position relative to its mounting stud, with dotted lines indicating the tie-down fitting shift required for disengagement from the mounting stud; and Figure 3 shows the position of the tie-down fitting when locked to the stud; and Figure 4 is a section taken on the line 4—4 of Figure 2; and Figure 5 is a side view taken on the line 5—5 of Figure 3.

As shown on the drawings:

The simplified perspective showing of a cross section of cargo airplane fuselage in Figure 1 is intended to illustrate the use of the cargo tie-down fittings of this invention to hold crates or the like 10 from sliding or bouncing around due to rough air or landing shocks. The cargo compartment comprises a floor 11 and walls 12 structurally supported from the skin 13 of the airplane fuselage, the walls of which may include windows 14 if intended to be convertible to a passenger compartment by the installation of removable seats.

The tie-down fitting of this invention is intended to be applied to a headed stud 15 mounted in floor and wall recesses 16 of a size to receive the fittings to be described so that they may freely swivel about the stud while in use but will lie flush in the recess when left in position.

The head 17 of the stud 15 is provided with a peripheral groove 18 to receive a yoke or strap 19 forming part of the fitting to be now described. The yoke or strap 19 is journaled at 20 in spaced positions along a pin 21 which is carried by a ring like member 22 to which straps, lashings or nets are attached to tie-down the cargo.

The yoke or strap 19 is formed with an inside central radius 23 matching the radius of the bottom of the stud groove 18 and adapted to engage therein, while the spaced journals 20 thereof are far enough apart to clear the maximum diameter of the stud head 17. The depth of the yoke or strap opening normal to and extending from the axis of the pin is also sufficient to clear the maximum head diameter, so that cutting away half of the pin as at 24 between the journals 20 of the yoke or strap allows removal of the yoke 19 from the stud head 17 by shifting the yoke to the right into the dotted line position of Figure 2.

The orientation of the cut away part of the pin 21 relative to the ring member 22 is a matter of choice. As shown it may be conveniently referred to as disposed opposite to the ring, in which case turning the ring over to the same side of the stud 15 as the yoke brings the full diameter of the pin 21 into locking engagement with the stud groove, preventing removal of the fitting from the stud. As shown in Figure 3 the yoke has been turned 180° from the showing of Figure 2, as the recess 16 can be decreased in size by offsetting the stud 15 therein so that the tie-down fitting is flush in only one position, although freely swivelling so that the load can be applied from any direction. The chief advantages in the opposite position of the groove as above described lie in the more compact recess, and that only a slight loosening of the strap or lashings is sufficient to permit disengagement of the ring and yoke from the stud. A reversal of the notch position would lock the ring and yoke on the stud in the position of Figure 2 and thus require further loosening or even complete disengagement of the strap or lashings from the ring before it could be turned over to the position of Figure 3 for release from the stud. In either case the pin 21 is fixed relative to the ring member 22 to cause the pins to rotate therewith, as by having a forced fit in the ring and/or having its ends staked in place relative to the ring member.

In using the tie-down fittings of this invention in a cargo type of airplane the studs 15 and their recesses 16 will be strategically distributed in the floor and walls of the cargo compartment to accommodate a wide range of cargo shapes and distributions. The floor distribution may match the desired seating or litter stanchion arrangement so that seats may be also mounted thereon for carrying passengers, or litter patients. Thus, there will be many more studs than tie-down fittings in use at any one time, so that to save weight only enough fittings to handle the load, plus a few spares, will normally be carried by the airplane. Accordingly, while the fittings can be left on the studs when not in use; ordinary practice would be to apply the fittings only to studs conveniently arranged relative to the cargo to be tied down.

To apply a fitting to a stud the fitting is opened by disposing the ring 21 and yoke 19 on opposite sides of the pin 21 as in Figure 2 and is then slipped down over the head 17 of the stud 15 in the dotted line position. Moving the entire fitting to the left to the full line position engages the yoke radius 23 in the stud groove 18, in which condition the ring 21 can be pivoted upwardly and the entire fitting swiveled about the stud for engagement by a strap, rope lashings, or cargo nets; tightening of the strap serving to hold the yoke in the stud groove 18 to tie-down the article of cargo. Slackening of the tie-down strap or the like permits removal of the fitting from the stud, so that the fitting can be left attached to the tie-down strap if desired.

It the fitting is to be left on the stud the ring part can be turned back over the yoke for compactness, in which case the fitting is locked to the stud by rotation of the pin 21 to the position of Figure 3, and the entire fitting rotated or swivelled on the stud until it will drop into the recess 16 flush with the surface of the floor or wall. The recess 16 could be tailored to closely conform to the folded fitting, but can be more easily produced by milling a slot therefor as shown.

It will thus be seen that I have invented an improved detachable tie-down fitting arranged to mount and swivel on a flush stud permanently attached to the floor or walls of the vehicle body such as an airplane cargo compartment, the fitting being capable of being locked on the stud if it is desired to leave it in place when not in use.

Having thus described my invention and the present preferred embodiments thereof, I desire to emphasize the fact that any modifications may be resorted to in a manner limited only by a just interpretation of the following claims.

I claim as my invention:

1. A tie-down fitting of the character described comprising a yoke member having spaced sleeves, the space within the yoke being so shaped as to slip over the cylindrical head of a mounting stud having a circumferential groove, the space being of such depth that the axis of said sleeves clears the head of said stud, said yoke member opposite to the sleeves being adapted to engage in the circumferential groove in the head of said stud, a ring-like member, a pin secured to the ring-like member and engaging in and rotatable in the sleeves of said yoke member, the pin extending across said space to restrict said yoke member to engagement in the groove in the stud, and an arcuate notch in said pin intermediate the journals in said yoke member, said arcuate notch extending to the axis of said pin and sleeves whereby when said pin and ring are rotated to a predetermined position such that the notch is concave to the stud, the yoke can be moved to clear the head of said stud.

2. A tie-down fitting of the character described for cooperation with a fixed mounting stud having a circumferential groove in its head, comprising a ring member in the general shape of a U, a pivot pin extending across the ends of the U, said pin having a central notch extending to the axis thereof, and a yoke member having spaced sleeves pivoted on said pin, the space within the yoke being so formed as to pass over the head of said stud when the pin notch is concave toward the stud, whereby when said ring and pin are rotated about the pin axis the pin notch is moved out of register with the stud to lock the yoke member in the groove in the head of said stud.

3. A device of the character described, arranged for application to a permanently mounted stud having a circular groove in its head, comprising a ring-like member and a yoke member fitting over said stud, a pin forming a common axis for said members, said pin being fixed relative to the ring-like member, the yoke member being freely rotatable on said pin and of a size to pass through the ring-like member, said yoke member having a U-shaped central aperture closed at its open side by said pin, said yoke aperture being of sufficient size to pass over the head of said stud, and said pin being so formed as in one position to restrict said yoke aperture to engagement in the groove in said stud.

4. A tie-down fitting of the character described comprising the combination of a headed stud having a circumferential groove in the head thereof, a ring-like member in the form of a U, a pivot pin anchored in the ends of the ring-like member, a yoke member also of general U shape with the ends thereof rotatable on said pivot pin, the interior of the yoke member opposite the pin being so shaped as to engage in the groove of said stud; said pin having a central concave notch to release said yoke member from said stud groove when the pin and ring-like member are turned to a predetermined position.

5. A tie-down fitting of the character described comprising the combination of a headed stud having a circumferential groove in the head thereof, a ring-like member and a yoke member both in the general form of a U of such size as to permit the yoke member to nest within the ring member, and a pivot pin joining the free ends of the two members and being fixed in the ends of the ring member, the open interior of the yoke member being so shaped as to engage the groove in the head of the stud, the pin having an arcuate notch to receive the head of the stud in one position of the ring to facilitate placing the yoke over the head of the stud whereby rotation of the ring member and pin will lock the yoke in the groove of the stud.

References Cited in the file of this patent
UNITED STATES PATENTS

| | | |
|---|---|---|
| 2,069,644 | Butterworth | Feb. 2, 1937 |
| 2,107,932 | Butterworth et al. | Feb. 8, 1938 |
| 2,422,693 | McArthur | June 24, 1947 |
| 2,449,049 | Black | Sept. 14, 1948 |
| 2,532,743 | Storch | Dec. 5, 1950 |
| 2,688,504 | Parker | Sept. 7, 1954 |